US010437751B1

(12) United States Patent
Norden et al.

(10) Patent No.: US 10,437,751 B1
(45) Date of Patent: Oct. 8, 2019

(54) DEVICE HOT PLUG SYSTEM

(71) Applicant: Dell Products L.P., Round Rock, TX (US)

(72) Inventors: Hahn Norden, Austin, TX (US); Christopher Arzola, Austin, TX (US); Austin Bolen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/953,208

(22) Filed: Apr. 13, 2018

(51) Int. Cl.
*G06F 13/40* (2006.01)
*G06F 11/16* (2006.01)
*G06F 13/16* (2006.01)

(52) U.S. Cl.
CPC ...... *G06F 13/1689* (2013.01); *G06F 13/4081* (2013.01)

(58) Field of Classification Search
None
See application file for complete search history.

(56) References Cited

U.S. PATENT DOCUMENTS

| 6,253,267 | B1* | 6/2001 | Kim | G06F 13/4081 |
| | | | | 710/302 |
| 6,286,066 | B1* | 9/2001 | Hayes | G06F 13/4081 |
| | | | | 235/492 |
| 7,493,438 | B2* | 2/2009 | Kaushik | G06F 13/4081 |
| | | | | 710/302 |
| 2008/0074555 | A1* | 3/2008 | Chen | H04N 9/641 |
| | | | | 348/720 |
| 2012/0092044 | A1* | 4/2012 | Lien | G06F 13/4081 |
| | | | | 327/142 |

OTHER PUBLICATIONS

Hot Socketing and Power-On Reset in Max II Devices, Oct. 2008, Altera, (Year: 2008).*
Samsung NGSFF SSD, Sep. 2018, Samsung (Year: 2018).*

* cited by examiner

*Primary Examiner* — Hyun Nam
(74) *Attorney, Agent, or Firm* — Haynes and Boone, LLP

(57) ABSTRACT

A device hot-plug system includes a chassis. A connector is included in the chassis. A reset pin is included on the connector. A hot-plug device is configured, in response to being hot-plugged to the connector, to enter a device reset state. While in the device reset state, the hot-plug device monitors a reference clock and determines that the reference clock has been stable for a predetermined time period. In response to determining that the reference clock has been stable for a predetermined time period, the hot-plug device exits the device reset state and provides a de-assertion signal on the reset pin.

20 Claims, 11 Drawing Sheets

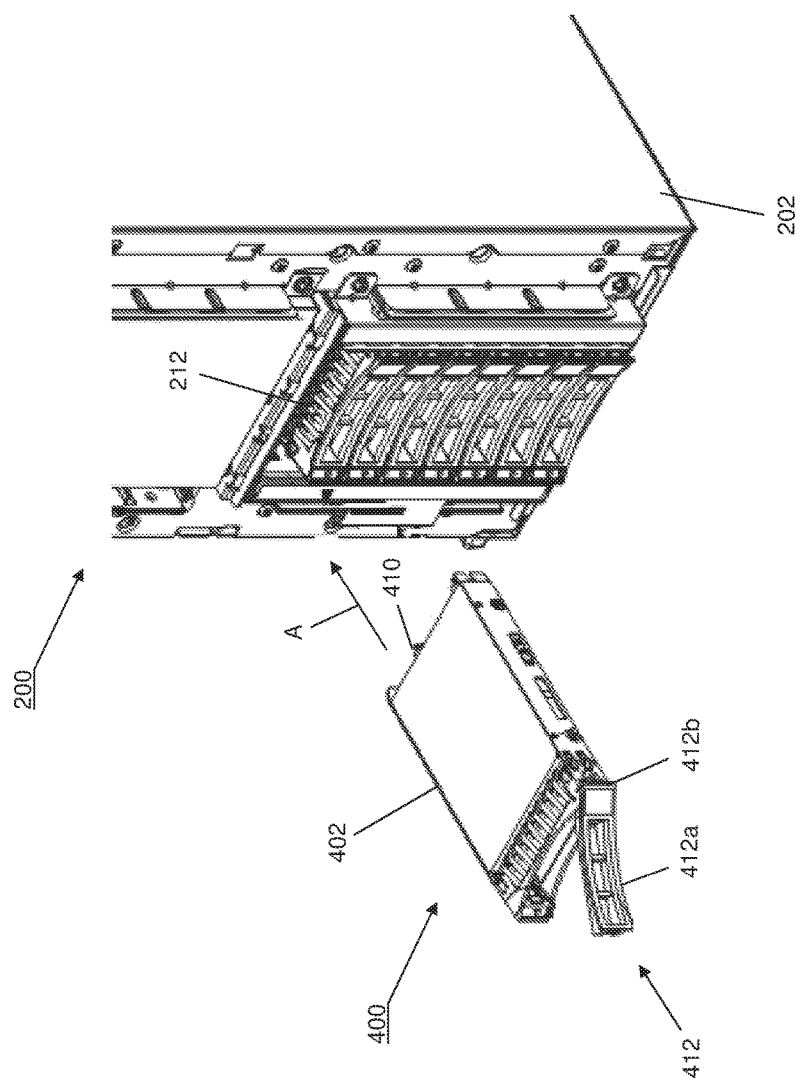

DEVICE HOT PLUG SYSTEM

BACKGROUND

The present disclosure relates generally to information handling systems, and more particularly to the hot plugging of devices in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems sometime utilize devices that may be "hot-plugged", "hot-swapped", "hot-inserted", and/or otherwise communicatively coupled to the system without shutting down or stopping the system. For example, server devices often utilize hot-plug devices for storage. The conventional hot-plugging of some single communication lane storage devices such as, for example, Serial Attached Small Computer System Interface (SCSI) (SAS) storage devices and Serial AT Attachment (SATA) storage drives, is relatively stable. However, the hot-plugging of multiple communication lane storage devices has been found to raise some issues. For example, Peripheral Component Interconnect (PCI) express (PCIe) Non-Volatile Memory storage devices (NVMe storage devices) experience several issues when utilizing conventional hot-plugging techniques.

Such NVMe storage devices typically include securing latches that are rotatably coupled to one end of the front face of the NVMe storage device, with those securing latches also coupled to a securing subsystem on the NVMe storage device that is configured to engage the server chassis and/or connector to which the NVMe storage device is being connected. Conventionally, when the securing latch is rotated away from the front face of the NVMe storage device such that the securing subsystem is unactivated, the NVMe storage device may be positioned in the storage device housing that is defined by the server system and located adjacent a server system connector. The securing latch may then be rotated towards the front face of the NVMe storage device in order to activate the securing subsystem to engage the server system and/or the sever system connector and mate the storage device connector on the NVMe storage device with the server system connector in the server system.

It has been found that the use of such securing latches to mate the storage device connector with the server system connector results in a sequential engagement of the pins on those connectors that can cause issues with the subsequent use of the NVMe storage device. For example, as the securing latch is rotated towards the front face of the NVMe storage device, the pins on the server system connector that are closest to the point of contact between the securing subsystem and the server system/server system connector (e.g., adjacent the fulcrum/rotatable coupling of the securing latch with the front face of the NVMe storage device) engage corresponding pins on the storage device connector first, followed sequentially by the pins that are further away from that point of contact. The server device connector includes four sets of communication lane pins that are distributed across its length, with the fourth communication lane pins located closest to that point of contact, and the first communication lane pins located further away from the point of contact between the securing subsystem and the server system/server system connector. Furthermore, the server system connector includes reset pin (e.g. a PERst pin) that is located approximately midway along the length of the server system connector, and a pair of reference clock pins that are located adjacent the end of the server system connector that is opposite the point of contact between the securing subsystem and the server system/server system connector.

In one example of issues resulting from such device hot-plug systems, the engagement of the storage device connector with the server system connector results in engagement of the storage device connector with power pins on the server system connector, along with the sequential engagement of the fourth communication lane pins, followed by engagement of the third communication lane pins, followed by engagement of the second communication lane pins, and followed by engagement of the first communication lane pins. In conventional systems, the NVMe storage device is configured with a 70 millisecond reset time that starts when the NVME storage device receives power from the server system connector. However, in some embodiments, prior to all of the sets of communication lane pins engaging, the reset time for the NVMe storage device may expire, causing problems with the operation of the NVMe storage device.

For example, in some situations the closing of the securing latch may cause the NVMe storage device to engage the fourth communication lane pins and the third communication lane pins, followed by engagement of the NVMe storage device with the reset pin after the expiration of the reset time for the NVMe storage device, which results in the reset of the NVMe storage device being driven by the engagement of the reset pin. Because the server system is in normal operating mode upon that engagement (i.e., the NVMe storage device is being hot-plugged to the server system), the reset pin is being de-asserted prior to the NVMe storage device engaging each of the second communication lane pins, the first communication lane pins, and the reference clock pins. This may cause NVMe storage devices that are configured to perform "lane reversal" to convert the fourth communication lane to a first communication lane (and the third communication lane to a second communication lane in some embodiments), and ignore any other communication lanes that would otherwise be enabled by the subsequent engagement of the first and second communication lane pins. As such, in this example, the NVMe storage device will not operate at its maximum throughput (i.e., the NVMe storage device is capable of communicating via four communication lanes, but only one or two communication lanes are enabled.) Furthermore, in NVMe storage devices that are not configured to perform "lane reversal", the NVMe storage device may not enable any communication lanes if an unexpected communication lane is detected (e.g., the fourth communication lane is detected when the first communication lane is expected), causing the NVMe storage device to be completely unusable (e.g., having no communication lanes available.)

In another example of issues resulting from such device hot-plug systems, the sequential engagement of the storage device connector with the server system connector results in the sequential engagement of the NVMe storage device with the reset pin, followed by engagement with the reference clock pins as discussed above. In some situations, the engagement of the NVMe storage device with the reset pin occurs prior to the reference clock (which is connected to the reference clock pins) reaching stability (e.g., 100 μs after engagement of the reference clock pins), and can cause the NVMe storage device to exit reset and enter its operational/functional state (i.e., the NVMe storage device will exit reset when the reset pin is engaged because the server system is not in reset.) The provisioning of the de-assertion signal on the reset pin while the reference clock is in the unstable state causes a violation (e.g., a Tperst-clk violation) of the PCIe electromechanical specification, and puts the NVMe storage device into a non-deterministic state due to the pre-reference-clock-stability de-assertion signal preventing its state machines from entering their default state (i.e., the state machines utilize the asynchronous de-assertion of the reset pin following reference clock stability to return to their default states.)

Accordingly, it would be desirable to provide an improved device hot-plug system.

SUMMARY

According to one embodiment, an Information Handling System (IHS) includes a processing system; and a memory system that is coupled to the processing system and that includes instructions that, when executed by the processing system, cause the processing system to provide a hot-plug engine that is configured, in response to a hot-plug event with a connector, to: enter a reset state; monitor, while in the reset state, a reference clock; determine, while in the reset state, that the reference clock has been stable for a predetermined time period; exit, in response to determining that the reference clock has been stable for the predetermined time period, the reset state; and provide, in response to exiting the reset state, a de-assertion signal on a reset pin included on the connector.

BRIEF DESCRIPTION OF THE DRAWINGS

FIG. 8A is a perspective view illustrating an embodiment of the hot-plug device of FIG. 4 being coupled to the server system of FIG. 2.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
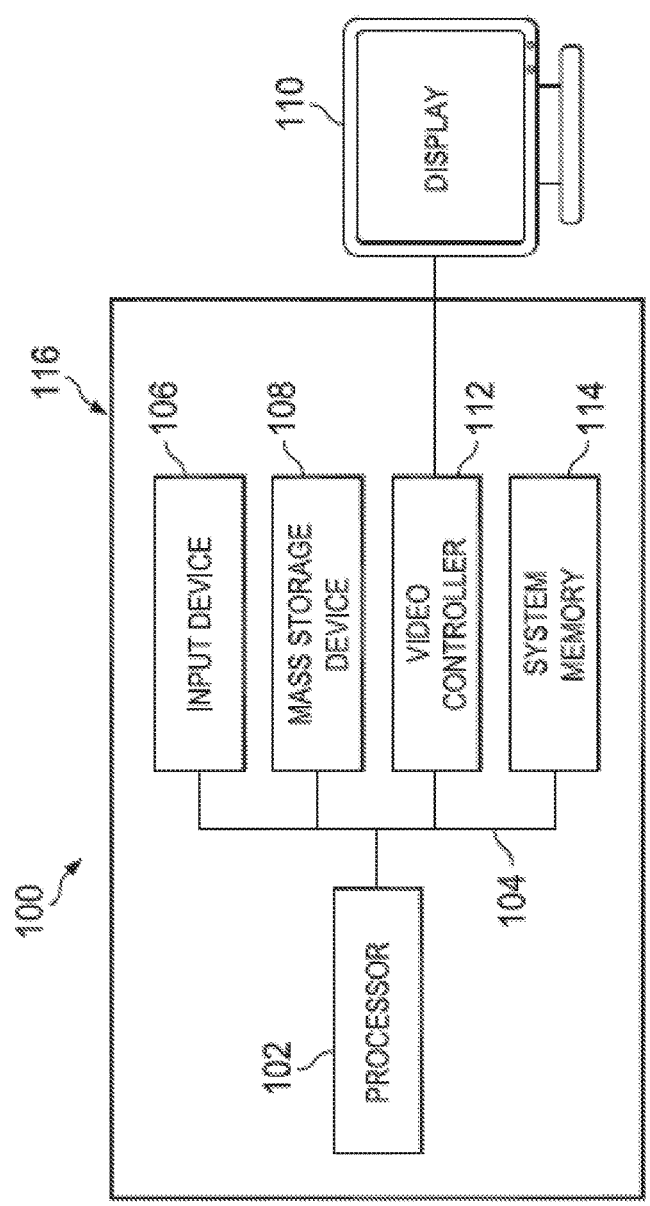
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mice, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
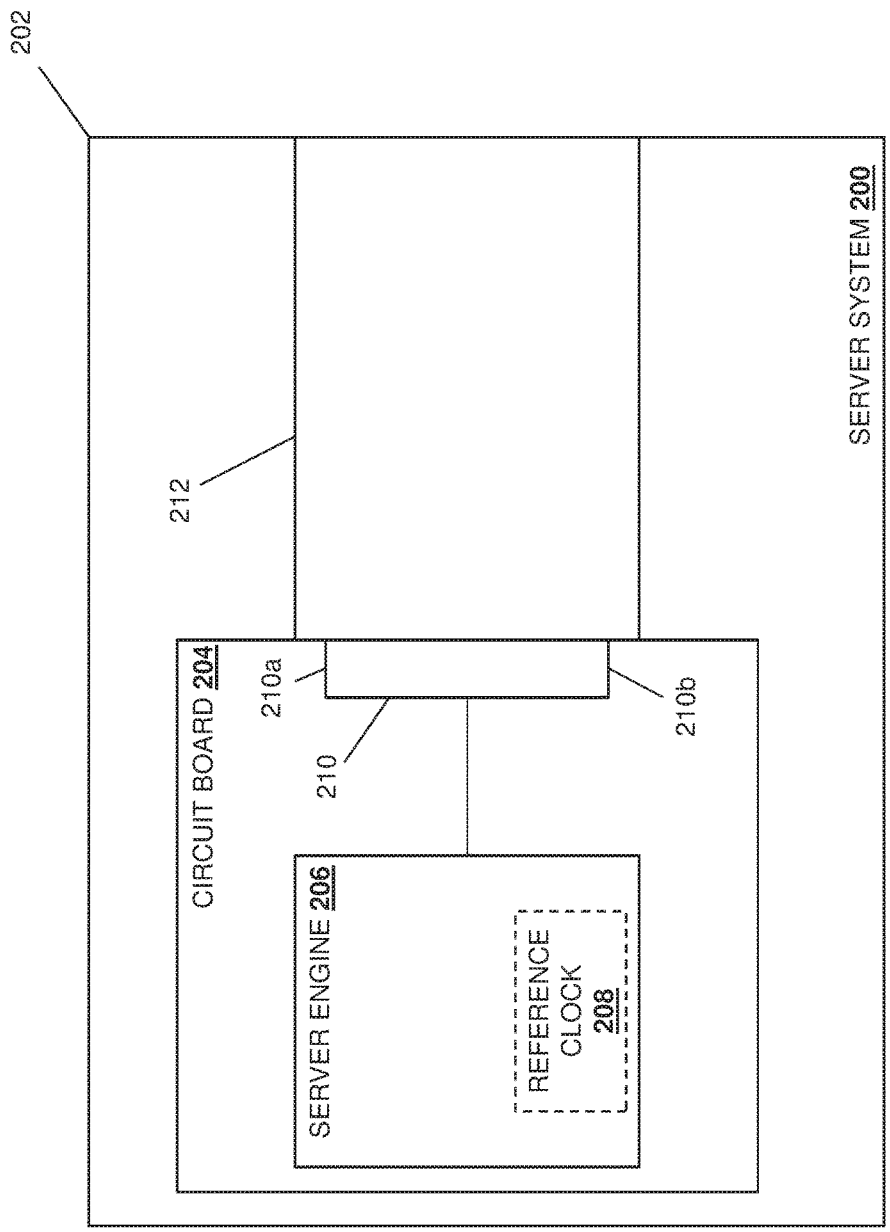
FIG. 2 is a schematic view illustrating an embodiment of a server system.

Referring now to FIG. 2, an embodiment of a server system 200 is illustrated. In an embodiment, the server system 200 may be provided by the IHS 100 discussed above with reference to FIG. 1, and/or may include some or all of the components of the IHS 100. In the illustrated embodiment, the server system 200 includes a chassis 202 that houses the components of the server system 200, only some of which are illustrated in FIG. 2. For example, the chassis 202 may house a circuit board 204 such as, for example, a motherboard and/or other boards that would be apparent to one of skill in the art in possession of the present disclosure. In the illustrated embodiment, the chassis 202 may also house a processing system (not illustrated, but which may include the processor 102 discussed above with reference to FIG. 1 and may be mounted to the circuit board 204), and a memory system (not illustrated, but which may include the memory 114 discussed above with reference to FIG. 1 and may be mounted to the circuit board 204) that is coupled to the processing system and that includes instruction that, when executed by the processing system, cause the processing system to provide a server engine 206 that is configured to perform the functions of the server engines and server systems discussed below.

In some embodiments, an optional reference clock 208 may be housed in the chassis 208. For example, FIG. 2 illustrates the optional reference clock 208 that is included as part of the server engine 206 and that is coupled to the circuit board 204, although other locations for a server-system-reference-clock will fall within the scope of the present disclosure as well. A connector 210 is mounted to the circuit board 204 and coupled to the server engine 206 (e.g., via a trace included on the circuit board 204.) In the examples below, the connector 210 is described as being a female Peripheral Component Interconnect express (PCIe) Non-Volatile Memory (NVMe) connector having a first end 210a and a second end 210b that is located opposite the connector 210 from the first end 210a, although other multi-communication lane connectors may benefit from the teachings of the present disclosure and thus are envisioned as falling within its scope as well. In the illustrated embodiment, the chassis 202 houses a device housing 212 that extends into the chassis 202 adjacent the connector 210 and that is configured to house the hot-plug device of the present disclosure. While a specific server system 200 has been illustrated and described for purposes of discussion herein, one of skill in the art in possession of the present disclosure will recognize that a variety of systems may include a variety of components, features, and/or configurations for providing conventional functionality, as well as for utilizing the hot-plug device of the present disclosure, while remaining within the scope of the present disclosure.

Figure 3:
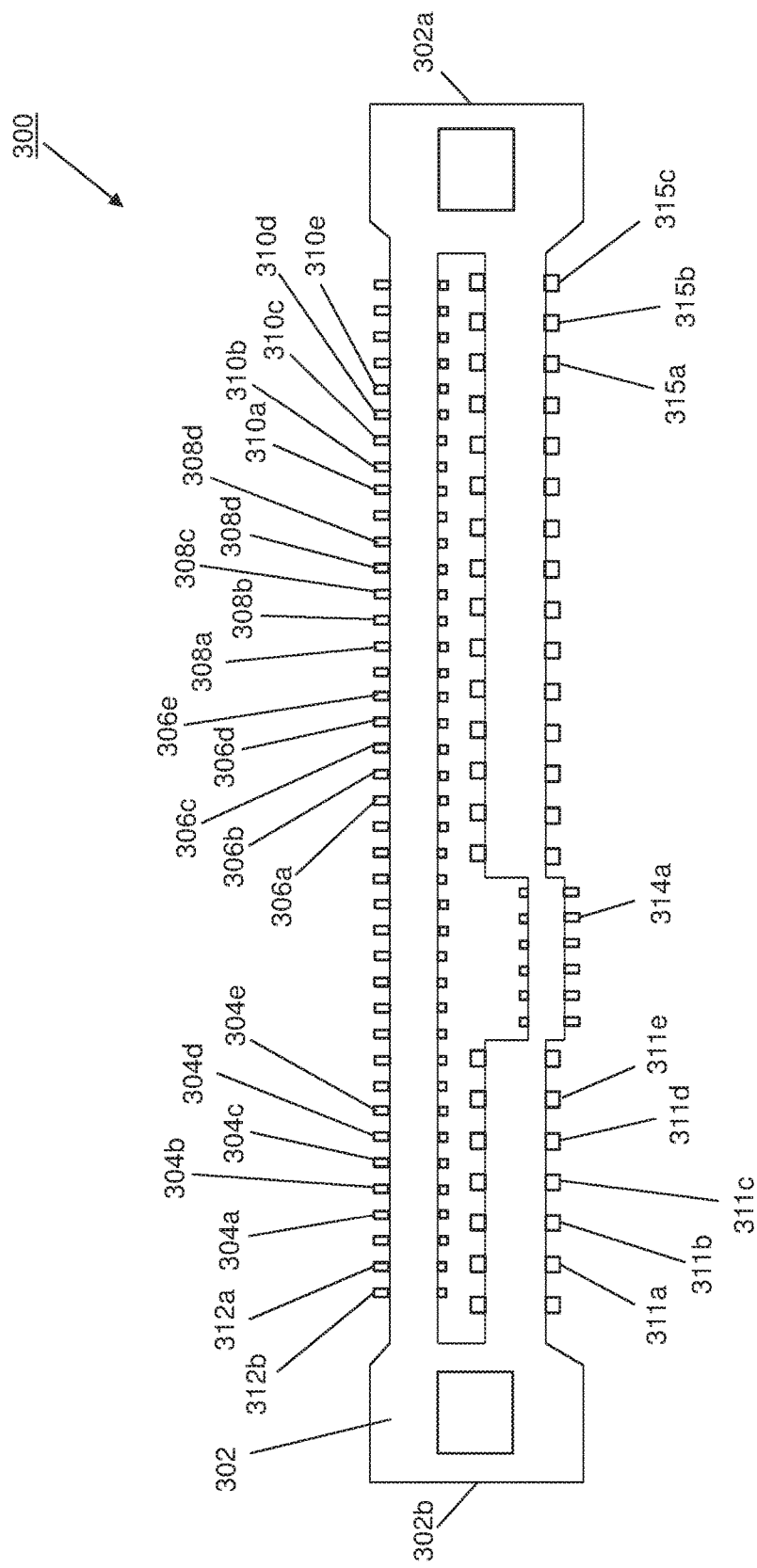
FIG. 3 is a schematic view illustrating an embodiment of a connector that may be provided in the server system of FIG. 2.

Referring now to FIG. 3, an embodiment of a connector 300 is illustrated that may be the connector 210 discussed above with reference to FIG. 2. As such, the connector 300 is illustrated and described as a female NVMe connector, although other multi-communication lane connectors may benefit from the teachings of the present disclosure and thus are envisioned as falling within its scope as well. The connector 300 includes a base 302 having a first end 302a that corresponds to the first end 210a of the connector 210 in the examples below, and a second end 302b that is located opposite the base 302 from the first end 302a and that corresponds to the second end 210b of the connector 210 in the examples below.

A plurality of pins may be provided on the connector 300. In the illustrated embodiment, a first set of communication lane pins 304a-304e are included on the connector 300 adjacent the second end 302b of the base 302, and may include an ePCIe lane 0 positive transmit pin 304a ("PETp0", pin #E10), an ePCIe lane 0 negative transmit pin 304b ("PETn0", pin #E11), a ground pin 304c ("GND", pin #E12), an ePCIe lane 0 negative receive pin 304d ("PERn0", pin #E13), and an ePCIe lane 0 positive receive pin 304e ("PERp0", pin #E14). Furthermore, a second set of communication lane pins 306a-306e are included on the connector 300 between the first set of communication lane pins 304a-e and the first end 302a of the base 302, and may include an ePCIe lane 1 positive transmit pin 306a ("PETp1", pin #E19), an ePCIe lane 1 negative transmit pin 306b ("PETn1", pin #E20), a ground pin 306c ("GND", pin #E21), an ePCIe lane 1 negative receive pin 306d ("PERn1", pin #E22), and an ePCIe lane 1 positive receive pin 306e ("PERp1", pin #E23). Further still, a third set of communication lane pins 308a-308e are included on the connector 300 between the second set of communication lane pins 306a-e and the first end 302a of the base 302, and may include an ePCIe lane 2 positive transmit pin 308a ("PETp2", pin #E25), an ePCIe lane 2 negative transmit pin 308b ("PETn2", pin #E26), a ground pin 308c ("GND", pin #E27), an ePCIe lane 2 negative receive pin 308d ("PERn2", pin #E28), and an ePCIe lane 2 positive receive pin 308e ("PERp2", pin #E29). Finally, a fourth set of communication lane pins 310a-310e are included on the connector 300 between the third set of communication lane pins 308a-e and the first end 302a of the base 302, and may include an ePCIe lane 3 positive transmit pin 310a ("PETp3", pin #E31), an ePCIe lane 3 negative transmit pin 310b ("PETn3", pin #E32), a ground pin 310c ("GND", pin #E33), an ePCIe lane 3 negative receive pin 310d ("PERn3", pin #E34), and an ePCIe lane 3 positive receive pin 310e ("PERp3", pin #E35).

In the some embodiments, a fifth set of communication lane pins 311a-311e are included on the connector 300 adjacent the second end 302b of the base 302 and opposite the base from the first set of communication lane pins 304a-e, and may include a SAS/SATA/SATAe lane 0 positive transmit pin 311a ("SOT+(A+)", pin #S2), a SAS/SATA/SATAe lane 0 negative transmit pin 311b ("SOT−(A−)", pin #S3), a ground pin 311c ("GND", pin #S4), a SAS/SATA/SATAe lane 0 negative receive pin 311d ("SOR−(B−)", pin #S5), and a SAS/SATA/SATAe lane 0 positive receive pin 311e ("SOR+(B+)", pin #S6). As discussed in the examples provided below, hot-plug devices such as x4 NVMe storage devices may enable the use of four communication lanes on the connector 300 that are provided by the first, second, third, and fourth set of communication lane pins discussed above, while hot-plug devices such as x1 SAS/SATA storage devices may enable the use of a single communication lane on the connector 300 that is provided by the fifth set of communication lane pins discussed above.

Furthermore, a plurality of reference clock pins 312a and 312b are included on the connector 300 between the first set of communication lane pins 304ae and the second side 302b of the base 302, and may include an ePCIe positive reference clock pin 312a ("RefClk0+", pin #E7) and an ePCIe negative reference clock pin 312b ("RefClk0−", pin #E8). One of skill in the art in possession of the present disclosure will recognize that the reference clock pins 312a and 312b on the connector 300 may be coupled to the reference clock 208 included in the server system 200 (e.g., via the traces between the server engine 206 and the connector 210 in FIG. 2) in situations where the optional reference clock 208 is included in the server system 200, and may be omitted or otherwise not utilized by the systems and methods of the present disclosure when the reference clock is included in the hot-plug device of the present disclosure (discussed in further detail below.) The connector 300 also include a reset pin 314a that located approximately midway along the length of the connector 300 between the fifth set of communication lane pins 311a-e and the first side 302a of the base 302, and may include an ePCIe port A reset pin 314a ("ePERst0#", pin #E5). The connector 300 also include a plurality of power pins 315a, 315b, and 315c, each of which are located adjacent the first side 302a of the base 302, and that may each include ePCIe SSD power pins (pins #P13, P14, and P15). While a specific connector has been illustrated and described, one of skill in the art in possession of the present disclosure will recognize that a variety of connectors utilized in hot-plug-enabled systems may benefit from the teachings of the present disclosure and thus fall within its scope as well.

Figure 4:
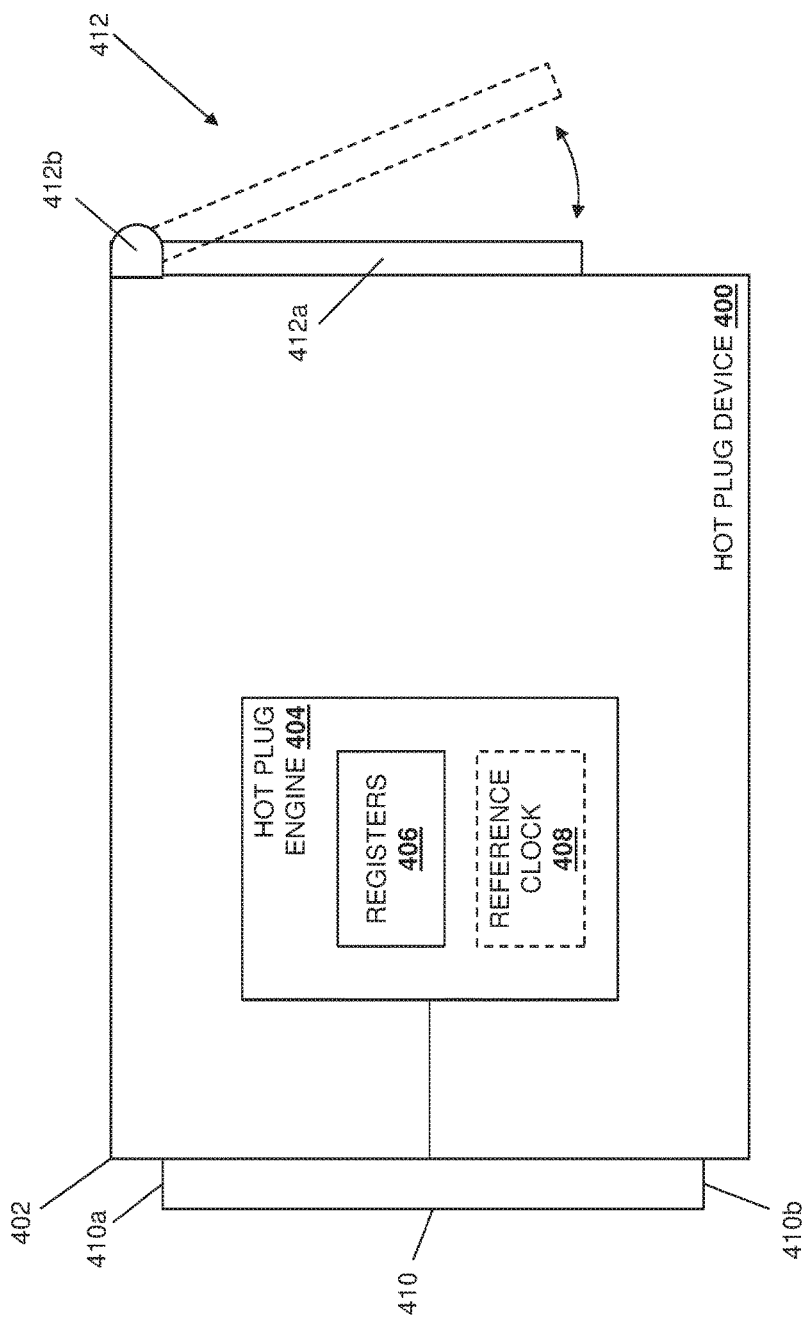
FIG. 4 is a schematic view illustrating an embodiment of a hot-plug device.

Referring now to FIG. 4, an embodiment of a hot-plug device 400 is illustrated. In some embodiment, the hot-plug device 400 may be provided by the IHS 100 discussed above with reference to FIG. 1, and/or may include some or all of the components of the IHS 100. In the examples below, the hot-plug device 400 is an NVMe device (and specifically, an NVMe storage device), but one of skill in the art in possession of the present disclosure will recognize that a variety of other hot plug devices may benefit from the teachings of the present disclosure and thus will fall within its scope as well. In the illustrated embodiment, the hot-plug device 400 includes a chassis 402 that houses the components of the hot plug-device 400, only some of which are illustrated in FIG. 4. For example, the chassis 402 may house a processing system (not illustrated, but which may include the processor 102 discussed above with reference to FIG. 1), and a memory system (not illustrated, but which may include the memory 114 discussed above with reference to FIG. 1) that is coupled to the processing system and that includes instructions that, when executed by the processing system, cause the processing system to provide a hot-plug engine 404 that is configured to perform the functions of the hot-plug engines and hot-plug devices discussed below. In a specific example, the hot-plug engine 404 may be provided by an Application Specific Integrated Circuit (ASIC) in the hot-plug device 400 (e.g., the storage device controller ASIC in an NVMe storage device), although other components (e.g., firmware, CPU/memory combinations, etc.) that may be configured to provide the functionality of the hot-plug engine 404 discussed below are envisioned as falling within the scope of the present disclosure as well.

In the illustrated embodiment, a plurality of registers 406 are housed in the chassis 402. For example, FIG. 4 illustrates the registers included as part of the server engine 206 (e.g., as registers included in the ASIC discussed above), although other locations for the registers will fall within the scope of the present disclosure as well. In some embodiments, an optional reference clock 408 may be housed in the chassis 402, and FIG. 4 illustrates the optional reference clock 408 included as part of the hot-plug engine 404, although other locations for a hot-plug-device-reference-clock will fall within the scope of the present disclosure as well. For example, the reference clock 408 may be provided in the hot-plug device 400 in possible future implementations of NVMe storage devices that provide Separate Reference clocks with Independent Spread Spectrum Clocking (SSC) (SRIS). As would be appreciated by one of skill in the art in possession of the present disclosure, SRIS implementations may omit the reference clock 208 from the server system 200 and the reference clock pins 312a and 312b on the connector 300, and instead provide that any two ends of a communication link (e.g., including the hot-plug device 400) include a separate reference clock (e.g., the reference clock 408). A connector 410 is included on the chassis 402 and is coupled to the hot-plug engine 404. In the examples below, the connector 410 is described as being a male Peripheral Component Interconnect express (PCIe) Non-Volatile Memory (NVMe) connector having a first end 410a and a second end 410b that is located opposite the connector 410 from the first end 410a, although other multi-communication lane connectors may benefit from the teachings of the present disclosure and thus are envisioned as falling within its scope as well. In the examples below, while not illustrated in detail, one of skill in the art in possession of the present disclosure will appreciate that the connector 410 includes pins that are configured to engage corresponding pins on the connector 300 (e.g., the communication lane pins, reference clock pins, and reset pin discussed with reference to FIG. 3).

In the illustrated embodiment, the chassis 402 include a securing subsystem having a securing latch 412. In the illustrated embodiment, the securing latch 412 includes a securing subsystem activation arm 412a that is rotatably coupled to the chassis 402 via a rotatable coupling 412b that allows the securing subsystem activation arm 412a to move between a securing orientation in which the securing subsystem activation arm 412a is located immediately adjacent the chassis 402 (illustrated in solid lines in FIG. 4), and a deactivated orientation in which the securing subsystem activation arm 412a is rotated away from the chassis 402 (illustrated in dashed lines in FIG. 4). While not illustrated, one of skill in the art in possession of the present disclosure will recognize that the securing latch 412 may be coupled to other components of the securing subsystem that are located on the chassis 402 and that are configured to engage the chassis 202 of the server system 200 and/or the connector 210/300 to couple the hot-plug device 400 the server system 200, discussed in further detail below. While a hot-plug device 400 has been illustrated and described for purposes of discussion herein, one of skill in the art in possession of the present disclosure will recognize that hot-plug devices may include a variety of components, features, and/or configurations for providing conventional hot-plug device functionality, as well as the functionality discussed below, while remaining within the scope of the present disclosure.

Figure 5:
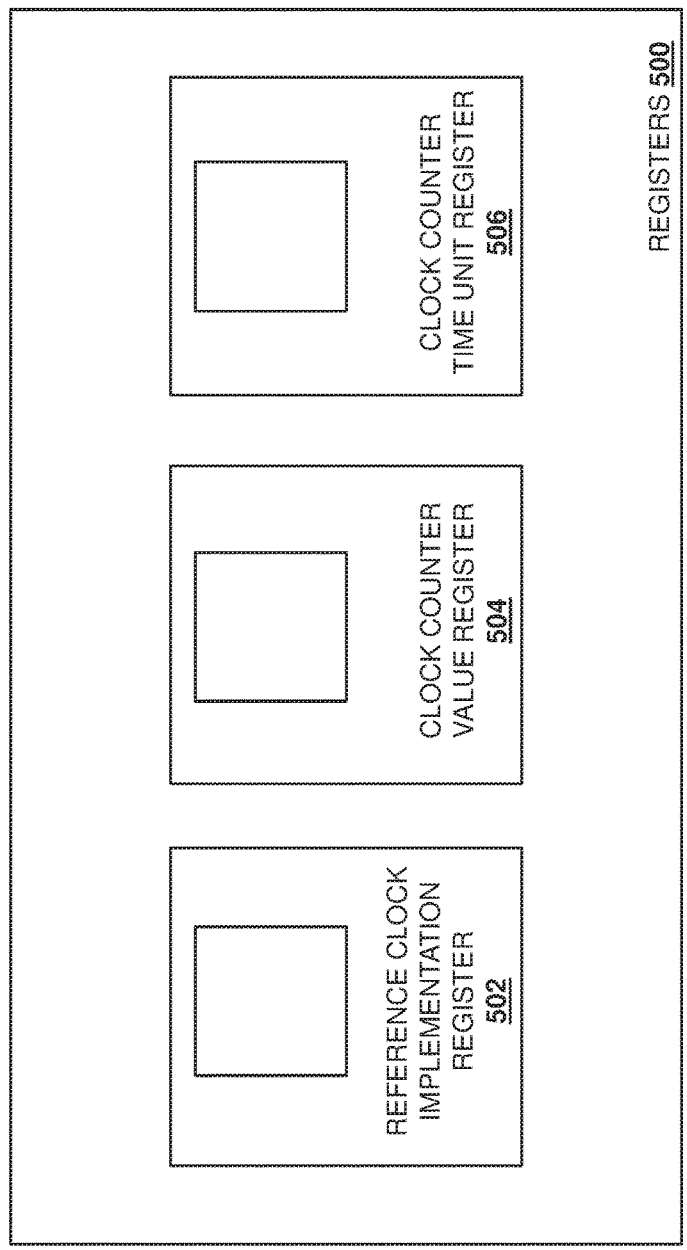
FIG. 5 is a schematic view illustrating an embodiment of registers that may be provided in the hot-plug device of FIG. 4.

Referring now to FIG. 5, an embodiment of a plurality of registers 500 are illustrated that may be the registers 406 discussed above with reference to FIG. 4. As such, in some embodiments, the registers 500 may be provided in an ASIC included in the hot-plug device 400. The registers 500 include a reference clock implementation register 502 that may be configured to indicate how a reference clock is implemented in the device hot-plug system of the present disclosure. In the examples below, the reference clock implementation register 502 may include a value of "0" to indicate the system reference clock is implemented in the device hot-plug system by the reference clock 208 included in the server system 200 (i.e., a reference clock that is external to the hot-plug device 400), and the reference clock implementation register 502 may include a value of "1" to indicate that the system reference clock is implemented in the device hot-plug system by the reference clock 408 included in the hot-plug device 400 (i.e., a reference clock that is internal to the hot-plug device 400). The registers 500 also include a clock counter value register 504 that may be configured to indicate an amount of time the hot-plug device 400 should remain in a device reset state (e.g., "100" in the example below), discussed in further detail below. The registers 500 also include a clock counter time unit register 506 that may be configured to indicate time units for the amount of time that the hot-plug device 400 should remain in the device reset state (e.g., "μs" in the example below), discussed in further detail below. While a specific examples of registers have been illustrated and described, one of skill In the art in possession of the present disclosure will recognize that the information included in the registers 500, and/or the functionality resulting from the use of that information, may be provided in a variety of manners that will fall within the scope of the present disclosure as well.

Figure 6:
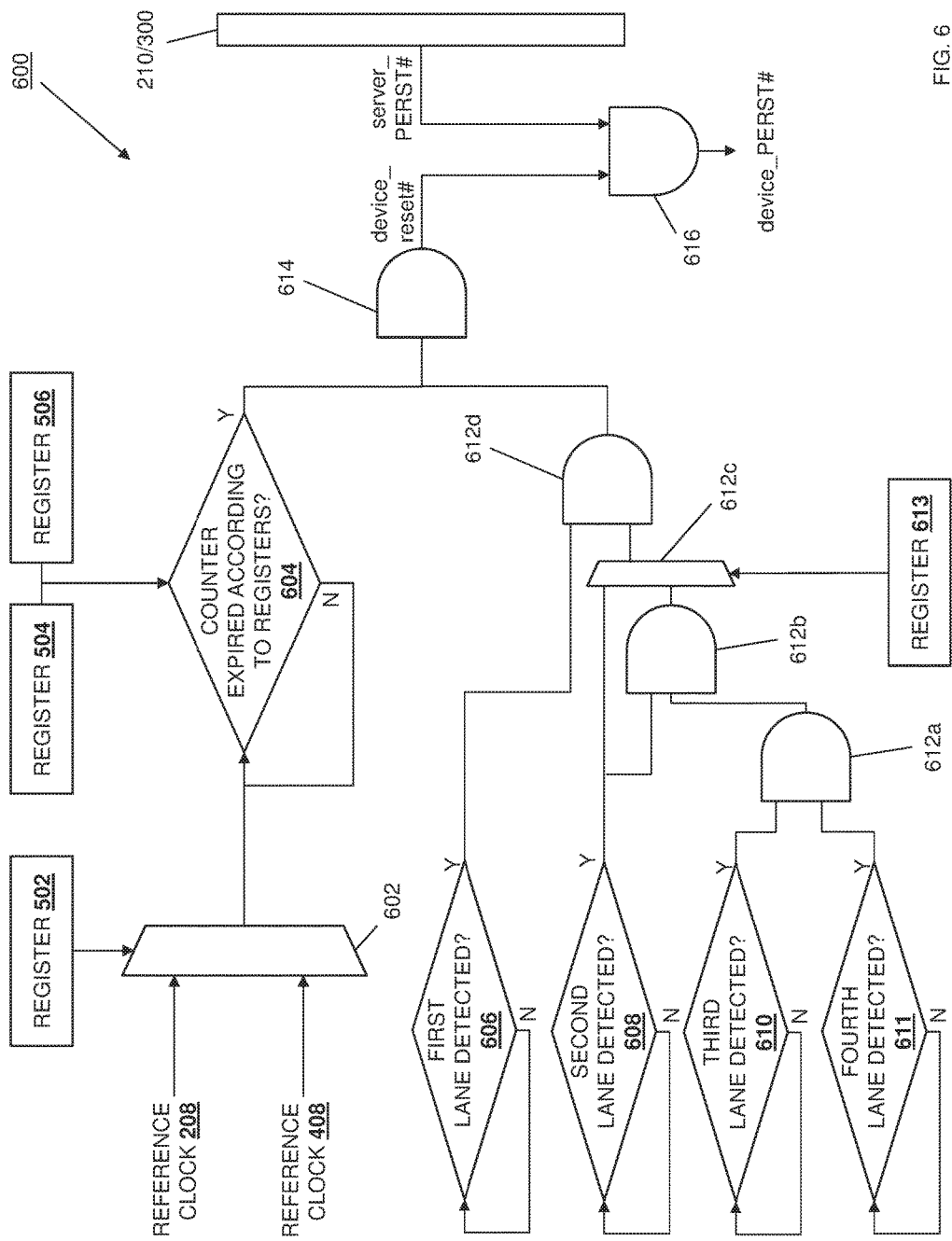
FIG. 6 is a schematic view illustrating an embodiment of a circuit that may be provided in the hot-plug device of FIG. 4.
Figure 7:
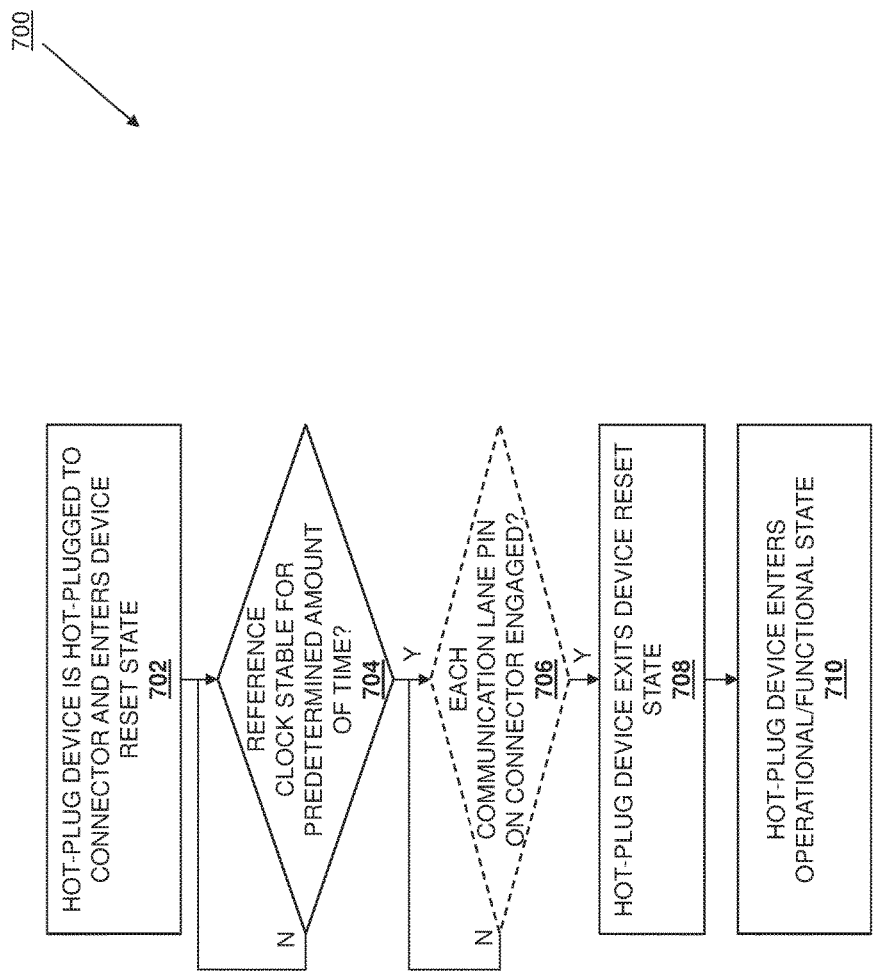
FIG. 7 is a flow chart illustrating an embodiment of a method for hot-plugging a device.

Referring now to FIG. 6, a schematic circuit 600 is illustrated that may be implemented by the hot-plug engine 404. In the illustrated embodiment, the circuit 600 includes a multiplexer 602 that receives inputs from the reference clock implementation register 502, and may receive inputs from either of the reference clocks 208 and 408 (when present in the hot-plug system). The multiplexer 602 outputs to a decision block 604 that receives inputs from the clock counter value register 504 and the clock counter time unit register 506, and that provides for the determination of whether a counter has expired according to those registers. The circuit 600 also includes decision blocks 606, 608, 610, and 611 that each provide for the determination of whether a respective communication lane has been detected. An AND gate 612a receives the YES outputs of each of the decision blocks 610 and 611, and will output a signal when each of those decision blocks have detected their respective communication lanes. An AND gate 612b receives the output of the AND gate 612a, and the YES output of decision block 608, and will output a signal when decision block 608 detects its respective communication lane, and the AND gate 612a indicates each of the decision blocks 610 and 611 have detected their respective communication lanes A multiplexer 612c receives inputs from decision block 608, AND gate 612b, and a register 613 in the hot-plug device 400 that indicates the number of communication lanes available for the hot-plug device 400 (e.g., four communications lanes in this example.) The multiplexer 612c outputs to an AND gate 612d that receives an input from decision block 606, and the AND gate 612d will output a signal when the decision block 606 detects its respective communication lane, and the multiplexer 612c indicates that the expected number of communication lanes have been detected. An AND gate 614 receives the YES output of the decision block 604, and the output of the AND gate 612d, and will output a device reset signal to an AND gate 616 when the decision block 604 determines that that a counter has expired according to the registers 504 and 506, and a signal is received from the AND gate 612d. The AND gate 616 also receives an input from the reset pin on the connector 210/300 (e.g., "PERst#", pin #E5), and will output the reset signal used to reset the hot-plug device in response to receiving the device reset signal from the AND gate 614 and detecting a connection to the reset pin on the connector 210/300. While a specific circuit has been illustrated and described, one of skill in the art in possession of the present disclosure will recognize that the functionality of the hot-plug engine 404 may be implemented in a variety of manners that will fall within the scope of the present disclosure as well Referring now to FIG. 7, an embodiment of a method 700 for hot-plugging a device is illustrated. As discussed herein, the systems and methods of the present disclosure provide a hot-plug device such as, for example, an NVMe storage device, that is configured, when being hot-plugged to a connector, to hold itself in a device reset state for a predetermined amount of time that is designated in register(s) included in the hot-plug device and that is known to allow a reference clock to reach a stable reference clock state. Following that predetermined amount of time and associated stability of the reference clock, the hot-plug device then performs a device reset that results in the provisioning of a de-assertion signal on a reset pin included on the connector that ensures that the hot-plug device is put into a deterministic state with associated state machines in their default state. In addition, the hot-plug device may also be configured, when being hot-plugged to the connector, to hold itself in the device reset state until each of the communication pins on the connector have been engaged in order to ensure that each communication lane on the hot-plug device is utilized in its subsequent operation. As such, securing subsystems on such hot-plug devices that include securing latches (and/or other features) that provide for sequential engagement of the hot-plug device with pins on the connector do not cause issues associated with conventional hot-plug systems such as, for example, the communication lane issues and reference clock instability/non-deterministic device state issues discussed above.

Figure 8B:
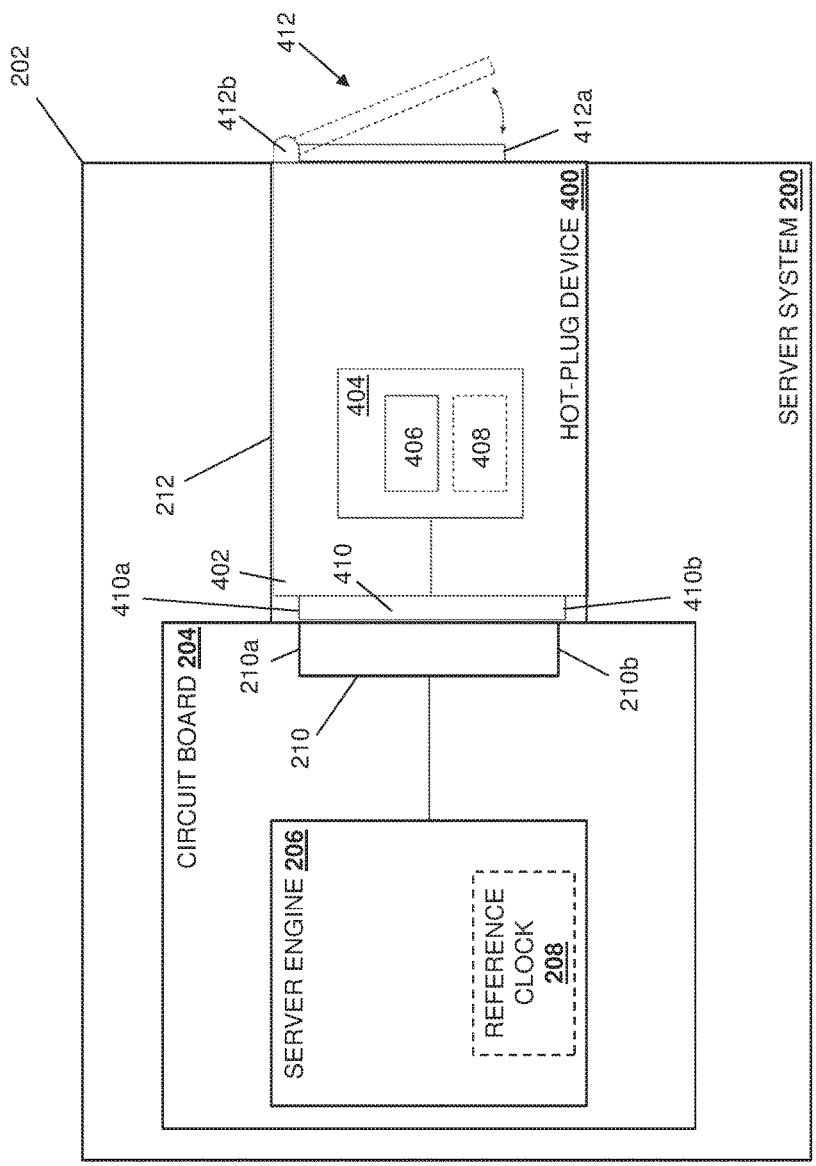
FIG. 8B is a schematic view illustrating an embodiment of the hot-plug device of FIG. 4 being coupled to the server system of FIG. 2.

The method 700 begins at block 702 where a hot-plug device is hot-plugged to a connector and enters a device reset state. In an embodiment, at block 702, the hot-plug device of FIG. 4 is hot-plugged to the connector 210/300 in the server system 200. For example, with reference to FIG. 8A, the hot-plug device 400 is positioned adjacent the server system 200 such that connector 410 on the hot-plug device 400 is located adjacent the device housing 212 on the server system 200, with the securing latch 412 in the deactivated orientation (illustrated by the dashed lines in FIG. 4). The hot-plug device 400 is then moved in a direction A such that the hot-plug device 400 enters the device housing 212 and moves through the device housing 212 until the connector 410 on the hot-plug device 400 is located immediately adjacent the connector 210/300 in the server system 200, as illustrated in FIG. 8B. The hot-plugging of the hot-plug device 400 to the connector 210/300 on the server system 200 occurs when the securing latch 412 is moved from the deactivated orientation in which the securing subsystem activation arm 412a is rotated away from the chassis 402 of the hot-plug device 400 (illustrated by the dashed lines in FIG. 8B) to the securing orientation in which the securing subsystem activation arm 412a is positioned immediately adjacent the chassis 402 of the hot-plug device 400 (illustrated by the solid lines in FIG. 8B). Positioning of the securing latch 412 in the securing orientation activates the securing subsystem on the hot-plug device 400 by, for example, causing that securing subsystem to engage the chassis 202 of the server system 200 and/or the connector 210/300 to mate the connector 410 on the hot-plug device 400 with the connector 210/300 in the server system 200, while securing the hot-plug device 400 in the chassis 202 of the server system 200.

In an embodiment, "hot-plugging", "hot-swapping", "hot-inserting", and/or otherwise communicatively coupling the hot-plug device 400 to the server system 200 without shutting down or stopping the server system 200 may be accomplished in a variety of manners. For example, the server engine 206 may include an operating system that is in a runtime state and that is controlling the operation of the server system 200 when the hot-plug device 400 is connected to the connector 210/300 in order to provide a hot-plug event. However, in some embodiments, the server engine 206 may include a Basic Input Output System (BIOS) that has been currently performing a boot of the server system 200 when the hot-plug device 400 is connected to the connector 210/300 in order to provide the hot-plug event. While a few examples have been provided, one of skill in the art in possession of the present disclosure will recognize that hot-plug events may occur and/or be performed in a variety of manners that will fall within the scope of the present disclosure.

As discussed above, the use of the securing latch 412 and securing subsystem on the hot-plug device 400 to mate the connector 410 on the hot-plug device 400 to the connector 210/300 causes a sequential engagement of the connector 410 on the hot-plug device 400 with the pins on the connector 210/300 in the server system 200. As can be seen in FIG. 8B, with the hot-plug device 400 positioned in the device housing 212 in the chassis 202 of the server system 200, the first end 410a of the connector 410 is located adjacent the first end 210a/302a of the connector 210/300, and the second end 410b of the connector 410 is located adjacent the second end 210b/302b of the connector 210/300. The movement of the securing latch 412 to the securing orientation cause the securing subsystem on the hot-plug device 400 to engage the engage the chassis 202 of the server system 200 and/or the connector 210/300 at a point of contact that is adjacent or on the first end 210a/302a of the connector 210/300 such that the connector 410 on the hot-plug device 400 first engages the pins on the connector 210/300 adjacent its first end 210a/302a, and then engages adjacent pins along the length of the connector 210/300 in sequence until the pins on the connector 210/300 adjacent its second end 210b/302b are engaged.

For example, with reference to FIG. 3, the sequential engagement of the connector 410 on the hot-plug device 400 with the connector 300 in this manner results in engagement of the power pins 315a-c, along with the sequential engagement of the fourth set of communication lane pins 310a-310e, followed by engagement of the third set of communication lane pins 318a-308e, followed by engagement of the second set of communication lane pins 306a-306e, and followed by engagement of the first set of communication lane pins 304a-304e. As discussed above for conventional NVMe storage device hot-plug systems, the engagement of the power pins 315a-c may start a reset time in the NVMe storage device and, prior to all of the sets of communication lane pins engaging, the reset time for the NVMe storage device may expire, causing problems with the operation of the NVMe storage device due to the reset of the NVMe storage device being driven by the engagement of the reset pin. Those problems may include the NVMe storage device performing a "lane reversal" to convert the a subset of the communication lanes (provided by the communication lane pins) to active communication lane(s) (and ignoring any other communication lanes that are enabled by subsequent engagement of the other sets of communication lane pins) and preventing the NVMe storage device from operating at its maximum throughput, or not enabling any communication lanes due to the detection of an unexpected communication lane and making the NVMe storage device unusable.

As also discussed above for conventional NVMe storage device hot-plug systems, the sequential engagement of the connector 410 on the hot-plug device 400 with the connector 300 in the manner discussed above may result in the sequential engagement of the reset pin 314a followed by engagement of the reference clock pins 312a and 312b. However, prior to the reference clock (which is connected to the reference clock pins) reaching stability, the NVMe storage device may reset and provide a de-assertion signal on the reset pin 314a, and the provisioning of the de-assertion signal on the reset pin 314a while the reference clock is in the unstable state causes a violation (e.g., a Tperst-clk violation) of the PCIe electromechanical specification, and puts the NVMe storage device into a non-deterministic state due to the pre-reference-clock-stability de-assertion signal preventing its state machines from entering their default state. As discussed in further detail below, the device hot-plug system of the present disclosure may operate to prevent these issues by having the hot-plug device "hold" itself in its device reset state until the reference clock is stable for a predetermined time period and, in some embodiments, "hold" itself in its device reset state until each of the communication lanes have been activated.

Figure 8C:
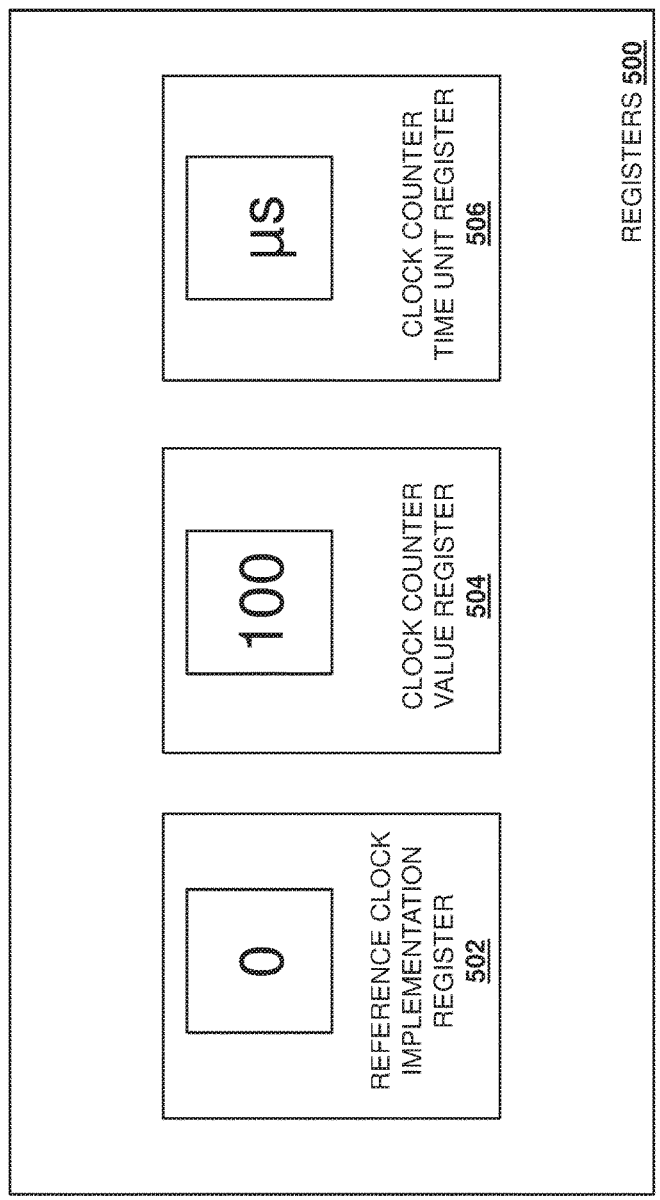
FIG. 8C is a schematic view illustrating an embodiment of the registers of FIG. 5 with particular values during the method of FIG. 7.

The method 700 then proceeds to decision block 704 where it is determined whether a reference clock has been stable for a predetermined amount of time. In server systems that include the reference clock 208 coupled to the reference clock pins 312a and 312b on the connector 210/300, at block 702 and during the hot-plugging of the hot-plug device 400 to the connector 210/300 on the server system 200, the connector 410 on the hot-plug device 400 will engage the reset pin 314a, followed by its engagement with the reference clocks pins 312a and 312b. The engagement of the connector 410 on the hot-plug device 400 with the reference clocks pins 312a and 312b allows the hot-plug engine 404 to begin monitoring the reference clock 208 at decision block 704. For example, at decision block 704, the hot-plug engine 404 may access the registers 406/500 and retrieve the values included therein to determine whether the reference clock 208 has been stable for the predetermined amount of time. With reference to FIG. 8C, an example of the registers 500 is illustrated with the reference clock implementation register 502 including a "0" to indicate that the reference clock 208 is included in the server system 200, and the clock counter value register 504 including a "100" and the clock counter time unit register 506 including a "µs" to indicate that the predetermined amount of time is 100 microseconds. With reference to FIG. 6, the reference clock implementation register 502 value of "0" may cause the hot-plug engine 404 to pass the signal from reference clock 208 to the decision block 604, and the clock counter value register 504 and clock counter time unit register 506 values of "100" and "µs" may cause the hot-plug engine 404 to monitor the signal from the reference clock 208 for 100 microseconds at decision block 604. For example, at decision block 704, a counter in the hot-plug engine 404 may be incremented based on the reference clock 208 (accessed via the engaged reference clock pins 312a and 312b) until that counter exceeds 100 microseconds.

Figure 8D:
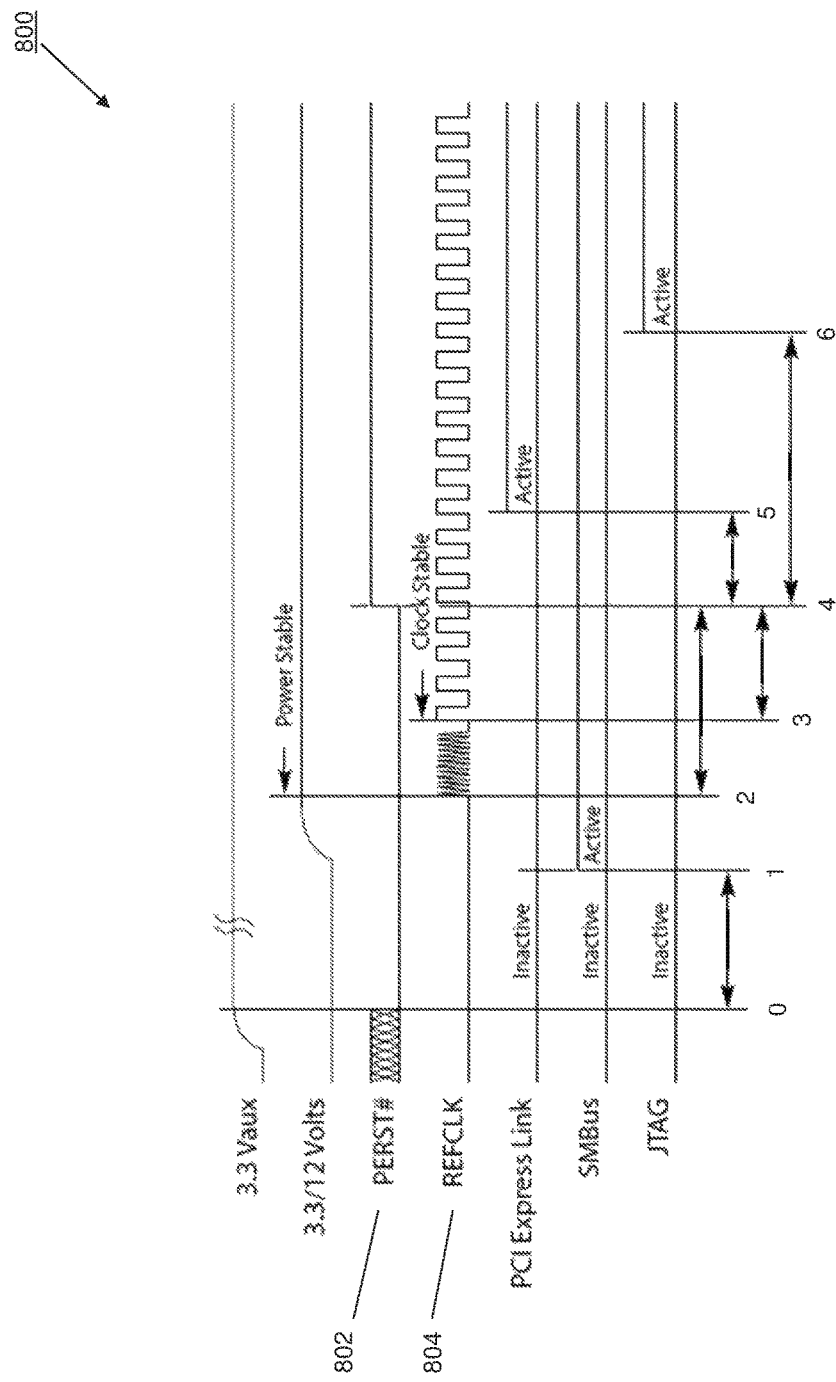
FIG. 8D is a chart illustrating an embodiment of signal generated in response to the hot-plugging of the hot-plug device of FIG. 4 to the server system of FIG. 2.

With reference to FIG. 8D, an embodiment of the hot-plugging of a hot-plug device (an NVMe storage device in this example) to a server system is illustrated. In the illustrated embodiment, a reset pin signal 802 (e.g., "PERST#") and a reference clock signal 804 (e.g., "REFCLK"), as well as a 3.3 $V_{aux}$ signal, a 3.3/12 volt signal, a PCI express link signal, a system management bus (SMBus) signal, and a Joint Test Action Group (JTAG) signal, provided during the hot-plug event are illustrated. As can be seen, at time 0, the reset pin signal 802 is asserted (which, in the illustrated example, causes the signal to go "low"), and at time 1, the 3.3/12 volt signal begins ramping up while the SMBus signal goes active. At time 2, the 3.3/12 volt signal is stable, and the reference clock signal 804 begins but is unstable. At time 3, the reference clock signal 804 becomes stable, and at time 4, the reset pin signal 802 is de-asserted. At time 5, the PCI express link signal is active, and at time 6, the JTAG signal is active. As would be understood by one of skill in the art, the time period between time 3 and time 4 corresponds to the time period between the time at which the reference clock signal becomes stable, and the time at which the reset pin signal 802 should be de-asserted (as de-asserting the reset pin signal 802 between time 2 and time 3 while the reference clock signal 804 is unstable can cause the issues discussed above). As such, using the example provided above, the time period between time 3 and time 4 may be set at 100 microseconds to ensure that the reference clock signal 804 is stable before de-asserting the reset pin signal 802.

In hot-plug devices that include the reference clock 408 (e.g., when the reference clock 208 in the server system 200 and the reference clock pins 312*a* and 312*b* on the connector 210/300 may be omitted), at block 702 and during the hot-plugging of the hot-plug device 400 to the connector 210/300 on the server system 200, the connector 410 on the hot-plug device 400 will engage the reset pin 314*a*. At decision block 704, the hot-plug engine 404 may begin monitoring the reference clock 408. For example, at decision block 704, the hot-plug engine 404 may access the registers 406/500 and retrieve the values included therein to determine whether the reference clock 408 has been stable for the predetermined amount of time. In such an example, the reference clock implementation register 502 may include a "1" to indicate that the reference clock 408 is included in the hot-plug device 400, with the clock counter value register 504 including a "100" and the clock counter time unit register 506 including a "μs" to indicate that the predetermined amount of time is 100 microseconds. With reference to FIG. 6, the reference clock implementation register 502 value of "1" may cause the hot-plug engine 404 to pass the signal from reference clock 408 to the decision block 604, and the clock counter value register 504 and clock counter time unit register 506 values of "100" and "μs" may cause the hot-plug engine 404 to monitor the signal from the reference clock 408 for 100 microseconds. For example, at decision block 704, a counter in the hot-plug engine 404 may be incremented based on the reference clock 408 until that counter exceeds 100 microseconds.

If at decision block 704 it is determined that the reference clock has not been stable for the predetermined amount of time, the method 700 returns to decision block 704 and continues to loop through decision block 704 until the reference clock has been stable for the predetermined amount of time (e.g., that counter based on the reference clock reaches 100 microseconds). When it is determined at block 704 that the reference clock has been stable for the predetermined amount of time (and the decision block 604 in FIG. 6 passes a signal to the AND gate 614), the method 700 may proceed to optional decision block 706 where it is determined whether each communication lane pin on the connector has been engaged. In an embodiment, at block 702 and during the hot-plugging of the hot-plug device 400 to the connector 210/300 on the server system 200, the connector 410 on the hot-plug device 400 will first engage the fourth set of communication lane pins 310*a*-310*e*, followed by engagement of the third set of communication lane pins 318*a*-308*e*, followed by engagement of the second set of communication lane pins 306*a*-306*e*, and followed by engagement of the first set of communication lane pins 304*a*-304*e*.

With reference to FIG. 6, the hot-plug engine 404 will monitor each of the sets of communications lane pins via the decision blocks 606, 608, 610, and 611. As can be seen, the decision blocks 606, 608, 610, and 611 operate to determine whether each of the first, second, third, and fourth communication lanes (i.e., provided by respective sets of communication lane pins), respectively, have been detected and, if so, pass a respective signal to the AND gates 612*1*, 612*b*, 612*d*, and the multiplexer 612*c*. As will be appreciated by one of skill in the art, the AND gate 612*d* may be configured to only pass a signal to the AND gate 614 when each of the communication lanes have been detected via the decision blocks 606, 608, 610, and 611, and the detected number of communication lanes corresponds to an expected number of communication lanes in the register 613. In embodiments of hot-plug devices with a single communication lane (e.g., SAS/SATA/SATAe storage devices), at block 706 the hot-plug engine 404 will monitor the set of communications lane pins via a single decision block 606, and that decision block 606 will operate to determine whether the fifth communication lane (i.e., provided by respective sets of communication lane pins 311*a*-*e*) has been detected (and is the only communication lane that is expected according to the register 613) and, if so, pass a respective signal to the AND gate 612*d*.

If at decision block 706 it is determined that each communication lane pin on the connector has not been engaged, the method 700 returns to decision block 706 and continues to loop through decision block 706 until each communication lane pin on the connector has been engaged. When it is determined at block 706 that each communication lane pin on the connector has been engaged, or following a determination that the reference clock has been stable for the predetermined amount of time (e.g., when optional decision block 706 is omitted), the method 700 proceeds to block 708 where the hot-plug device exits the device reset state. While decision blocks 704 and 706 have been illustrated and described as being performed separately with decision block 704 being performed before decision block 706, those decision blocks may be performed simultaneously or in a different order while remaining within the scope of the present disclosure. For example, in embodiments in which the reference clock is included in the server system 200, decision block 704 may be performed (e.g., a determination that reference clock is stable) prior to decision block 706 being performed (e.g., a determination that all communication lanes have been detected). In another example, in embodiments in which the reference clock is included in the hot-plug device 400, decision block 706 may be performed (e.g., a determination that all communication lanes have been detected) prior to decision block 704 being performed (e.g., a determination that reference clock is stable.)

In an embodiment, at block 708, the hot-plug engine 404 causes the hot-plug device 400 to exit its device reset state. For example, upon the decision block 604 passing its signal to the AND gate 614, and the AND gate 612*d* passing its signal to the AND gate 614, the hot-plug engine 404 may be configured to cause the hot-plug device 400 to exit its device reset state (e.g., the "device_reset#" output of the AND gate 614). The method 700 then proceeds to block 710 where the hot-plug device enters an operational/functional state by providing a de-assertion of the hot-plug device function/operation reset, taking the hot-plug device out of the reset state and into the operational/functional state. In an embodiment, at block 710, the decision block 604 passing its signal to the AND gate 614, and the AND gate 612*d* passing its signal to the AND gate 614, causes the AND gate 614 to provide a signal (device_reset#) to the AND gate 616. In addition, the engagement of the hot-plug device 400 with the connector 210/300 will cause a reset-pin signal (server- _PERst#) to be provided to the AND gate 616. Upon receiving those signals, the AND gate 616 will provide a signal that causes a de-assertion of the hot-plug device function/operation reset. As discussed above, due to decision block 604, that de-assertion signal is only provided once the time period between time 3 and time 4 in FIG. 8D (which corresponds to the time designated by the clock counter value register 504 and the clock counter time unit register 506) has elapsed. As such, the hot-plug device 400 is configured to hold itself in its device reset state until the reference clock has become stable, and in some embodiments may also hold itself in its device reset state until each of the communication lanes for the hot-plug device 400 have been detected.

Thus, systems and methods have been described that provide for an NVMe storage device that is configured, when being hot-plugged to a connector, to hold itself in a reset state for a predetermined amount of time until a reference clock has reached a stable reference clock state. Following that predetermined amount of time and associated stability of the reference clock, the NVMe storage device then performs a device reset that results in the provisioning of a de-assertion signal on a reset pin included on the connector that ensures that the NVMe storage device is put into a deterministic state with associated state machines in their default state. In addition, the NVMe storage device may also be configured, when being hot-plugged to the connector, to hold itself in the reset state until each of the communication pins on the connector have been engaged in order to ensure that each communication lane on the NVMe storage device is utilized in its subsequent operation. As such, securing subsystems on such NVMe storage device that include securing latches (and/or other features) that provide for sequential engagement of the NVMe storage device with pins on the connector do not cause issues associated with conventional hot-plug systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A device hot-plug system, comprising:
a chassis;
a connector included in the chassis;
a reset pin included on the connector; and
a hot-plug device that is configured, in response to being hot-plugged to the connector, to:
  enter a device reset state;
  monitor, while in the device reset state, a reference clock;
  determine, while in the device reset state, that the reference clock has been stable for a predetermined time period;
  exit, in response to determining that the reference clock has been stable for the predetermined time period, the device reset state; and
  provide, in response to exiting the device reset state, a de-assertion signal on the reset pin.

2. The system of claim 1, further comprising:
a plurality of communication pins included on the connector, wherein the hot-plug device is configured, in response to being hot-plugged to the connector, to:
  determine, while in the device reset state, that each of the plurality of communication pins have been engaged; and
  exit, in response to determining that each of the plurality of communication pins have been engaged and that the reference clock has been stable for the predetermined time period, the device reset state.

3. The system of claim 1, wherein the reference clock is housed in the chassis and coupled to at least one reference clock pin that is included on the connector, and wherein the hot-plug device is configured to determine that the reference clock has been stable for the predetermined time period via the at least one reference clock pin.

4. The system of claim 1, wherein the reference clock is included in the hot-plug device, and wherein the hot-plug device is configured to determine that the reference clock has been stable for the predetermined time period by monitoring the reference clock included in the hot-plug device.

5. The system of claim 1, further comprising:
at least one register that is included in the hot-plug device, wherein the predetermined time period is designated by the at least one register.

6. The system of claim 1, wherein the connector is a Peripheral Component Interconnect express (PCIe) Non-Volatile Memory (NVMe) device connector, and wherein the hot-plug device is an NVMe device.

7. An Information Handling System (IHS), comprising:
a processing system; and
a memory system that is coupled to the processing system and that includes instructions that, when executed by the processing system, cause the processing system to provide a hot-plug engine that is configured, in response to a hot-plug event with a connector, to:
  enter a reset state;
  monitor, while in the reset state, a reference clock;
  determine, while in the reset state, that the reference clock has been stable for a predetermined time period;
  exit, in response to determining that the reference clock has been stable for the predetermined time period, the reset state; and
  provide, in response to exiting the reset state, a de-assertion signal on a reset pin included on the connector.

8. The IHS of claim 7, wherein the hot-plug engine is configured, in response to the hot-plug event with the connector, to:
  determine, while in the reset state, that each of a plurality of communication pins on the connector have been engaged; and
  exit, in response to determining that each of the plurality of communication pins have been engaged and that the reference clock has been stable for the predetermined time period, the reset state.

9. The IHS of claim 7, wherein the reference clock is coupled to at least one reference clock pin that is included on the connector, and wherein the hot-plug engine is configured to determine that the reference clock has been stable for the predetermined time period via the at least one reference clock pin.

10. The IHS of claim 7, wherein the reference clock that is directly connected to the processing system, wherein the hot-plug engine is configured to determine that the reference clock has been stable for the predetermined time period by monitoring the reference clock directly connected to the processing system.

11. The IHS of claim 7, further comprising:
at least one register that is coupled to the processing system, wherein the predetermined time period is designated by the at least one register.

12. The IHS of claim 7, wherein the connector is a Peripheral Component Interconnect express (PCIe) Non-Volatile Memory (NVMe) device connector.

13. The IHS of claim 7, further comprising:
a chassis housing the processing system and the memory system; and
a securing latch that is included on the chassis and that is configured to activate a securing subsystem that causes sequential engagement of pins on the connector.

14. A method for hot-plugging a device, comprising:
entering, by a hot-plug device in response to being hot-plugged to a connector, a device reset state;
monitoring, by the hot-plug device while in the device reset state, a reference clock;
determining, by the hot-plug device while in the device reset state, that the reference clock has been stable for a predetermined time period;
exiting, by the hot-plug device in response to determining that the reference clock has been stable for the predetermined time period, the reset state; and
providing, by the hot-plug device in response to exiting the reset state, a de-assertion signal on a reset pin included on the connector.

15. The method of claim 14, further comprising:
determining, by the hot-plug device while in the device reset state, that each of a plurality of communication pins on the connector have been engaged; and
exiting, by the hot-plug device in response to determining that each of the plurality of communication pins have been engaged and that the reference clock has been stable for the predetermined time period, the device reset state.

16. The method of claim 14, wherein the reference clock is coupled to at least one reference clock pin that is included on the connector, and wherein the hot-plug device is configured to determine that the reference clock has been stable for the predetermined time period via the at least one reference clock pin.

17. The method of claim 14, wherein the reference clock is included in the hot-plug device, and wherein the hot-plug device is configured to determine that the reference clock has been stable for the predetermined time period by monitoring the reference clock included in the hot-plug device.

18. The method of claim 14, wherein the predetermined time period is designated by at least one register that is included in the hot-plug device.

19. The method of claim 14, wherein the connector is a Peripheral Component Interconnect express (PCIe) Non-Volatile Memory (NVMe) device connector, and wherein the hot-plug device is an NVMe device.

20. The method of claim 14, further comprising:
a securing latch that is included on the hot-plug device and that is configured to activate a securing subsystem that causes sequential engagement of pins on the connector.

* * * * *